US009866091B2

(12) United States Patent
Ishimaru et al.

(10) Patent No.: US 9,866,091 B2
(45) Date of Patent: Jan. 9, 2018

(54) MOTOR APPARATUS FOR VEHICLE

(71) Applicant: MITSUBISHI JIDOSHA KOGYO KABUSHIKI KAISHA, Tokyo (JP)

(72) Inventors: Eiji Ishimaru, Tokyo (JP); Ryunosuke Furusawa, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 14/853,277

(22) Filed: Sep. 14, 2015

(65) Prior Publication Data

US 2016/0105083 A1    Apr. 14, 2016

(30) Foreign Application Priority Data

Oct. 8, 2014  (JP) ................................. 2014-207367

(51) Int. Cl.
| | |
|---|---|
| *H02K 9/00* | (2006.01) |
| *H02K 9/19* | (2006.01) |
| *H02K 5/15* | (2006.01) |
| *H02K 5/20* | (2006.01) |
| *H02K 5/22* | (2006.01) |

(Continued)

(52) U.S. Cl.
CPC ............. *H02K 9/19* (2013.01); *H02K 5/15* (2013.01); *H02K 5/20* (2013.01); *H02K 5/22* (2013.01); *H02K 11/0073* (2013.01); *H02K 11/215* (2016.01); *H02K 11/33* (2016.01); *H02K 2211/03* (2013.01)

(58) Field of Classification Search
CPC ...... H02K 11/0073; H02K 11/21; H02K 9/19; H02K 11/00; H02K 5/20; H02K 11/33; H02K 11/03

USPC .......................................... 310/54, 52, 58, 64
See application file for complete search history.

(56) References Cited

U.S. PATENT DOCUMENTS 9,373,986 B2 * 6/2016 Quade .................... H02K 11/33
2005/0223727 A1 * 10/2005 Funahashi ............... F01C 21/10
62/228.4

(Continued)

FOREIGN PATENT DOCUMENTS

| | | |
|---|---|---|
| JP | 2006-197781 A | 7/2006 |
| WO | WO 98/28833 A2 | 7/1998 |

(Continued)

OTHER PUBLICATIONS

Extended European Search Report dated May 4, 2016 issued in corresponding European Patent Aplication No. 15188844.3.

*Primary Examiner* — Hanh Nguyen
(74) *Attorney, Agent, or Firm* — Birch, Stewart, Kolasch & Birch, LLP

(57) ABSTRACT

A motor apparatus for a vehicle includes a motor unit, an inverter unit, a case, and a pump. The case has a motor space accommodating the motor unit, two or more inverter spaces each accommodating the inverter unit, and a cooling passage. The inverter spaces are provided adjacent to the motor space via respective walls, and each accommodating at least one of the capacitor, the power converter, and the control circuit. The cooling passage includes a first cooling part configured to cool the power converter and a second cooling part configured to cool the capacitor. A length of the cooling passage from a discharging part of the pump to the first cooling part is made shorter than a length of the cooling passage from the discharging part to the second cooling part.

16 Claims, 6 Drawing Sheets

(51) Int. Cl.
*H02K 11/215* (2016.01)
*H02K 11/33* (2016.01)
*H02K 11/00* (2016.01)

(56) References Cited

U.S. PATENT DOCUMENTS

| | | | | |
|---|---|---|---|---|
| 2008/0143201 A1* | 6/2008 | Ramy | ............... | H02K 5/15 |
| | | | | 310/59 |
| 2011/0169352 A1* | 7/2011 | Nagao | ............... | H02K 5/20 |
| | | | | 310/59 |
| 2011/0261588 A1 | 10/2011 | Hattori et al. | | |

FOREIGN PATENT DOCUMENTS

| | | |
|---|---|---|
| WO | WO 2013/069319 A1 | 5/2013 |
| WO | WO 2013/080747 A1 | 6/2013 |

* cited by examiner

MOTOR APPARATUS FOR VEHICLE

CROSS-REFERENCE TO THE RELATED APPLICATION

This application incorporates by references the subject matter of Application No. 2014-207367 filed in Japan on Oct. 8, 2014 on which a priority claim is based under 35 U.S.C. §119(a).

FIELD

The present invention relates to a motor apparatus (a prime mover in the form of an electric motor) for driving a vehicle.

BACKGROUND

An electric vehicle and a hybrid vehicle are equipped with a motor for running or driving the vehicle, and an inverter that generates AC power for driving the motor. The motor and the inverter are disposed near to each other, electrically connected to each other via, for example, a high voltage cable(s), and together compose a power plant.

Regarding this configuration, Patent Document 1 (Japanese Patent Laid-Open No. 2006-197781) discloses an inverter integrated motor unit that integrates a motor with an inverter, and that includes therein a coolant passage for cooling the motor and the inverter. This coolant passage composes a flow path so as to cool the inverter (an inverter circuit part and a condenser) before cooling the motor, and is configured to supply the inverter, which has an allowable temperature lower than that of the motor, with the coolant having a relatively low temperature.

SUMMARY

Technical Problems

As in the case of Patent Document 1, a motor power plant for a vehicle requires an elevated cooling performance for the inverter which has an allowable temperature lower than that of the motor. If the inverter has a temperature higher than the allowable temperature, components of the inverter may be damaged, and/or the motor may be forced to shut down due to overheat protection, resulting in a risk of the vehicle being unable to run. Among general components of the inverter, such as power elements or so-called switching elements for switching, a control circuit, and a capacitor, especially the switching elements generate great amount of heat and tend to have elevated temperatures. To deal with this inconvenience, the emphasis is on how to enhance the cooling performance for the switching elements.

With the foregoing problems in view, an object of the present invention is to provide a motor apparatus for a vehicle, the motor apparatus being capable of enhancing the cooling performance for an inverter. Another object of the present invention is to achieve advantageous effects that cannot be achieved through the traditional art by employing the configurations described below in the embodiments of the present invention.

Solution to Problems (1) A disclosed motor apparatus for a vehicle includes a motor unit configured to generate power for driving the vehicle; an inverter unit including a capacitor configured to smooth DC power, a power converter having multiple switching elements, and a control circuit configured to control the power converter; a case having a motor space, two or more inverter spaces, and a cooling passage, the motor space accommodating the motor unit, each of the inverter spaces accommodating the inverter unit, the cooling passage being configured to let cooling medium flow through the cooling passage to cool the motor unit and the inverter unit; and at least one pump configured to forward the cooling medium to the cooling passage, wherein: the inverter spaces are provided adjacent to the motor space via respective walls, and each accommodating at least one of the capacitor, the power converter, and the control circuit; and the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

Advantageous Effects

According to a disclosed motor apparatus for a vehicle, the cooling performance for the inverter can be enhanced.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A motor apparatus for a vehicle will now be described with reference to the accompanying drawings. The embodiments described below are merely examples, and it is not intended to exclude various modifications and technical applications that are not described in the embodiments described below. The configurations of the embodiments can be carried out in various modified forms without departing from the subject matter of the embodiments, and can be selectively applied as occasion demands or can be combined suitably.

1. Configurations

A motor apparatus for a vehicle (hereinafter, simply referred to as "motor apparatus") according to this embodiment is mounted on an electric-powered vehicle, such as an electric vehicle and a hybrid vehicle, and converts electrical energy stored in batteries into mechanical energy. The motor apparatus (a prime mover in the form of an electric motor) is electrically connected to the batteries while mechanically connected to wheels. The motor apparatus generates rotational force from the electric power of the batteries, and transmits the rotational force to the wheels.

Figure 1:
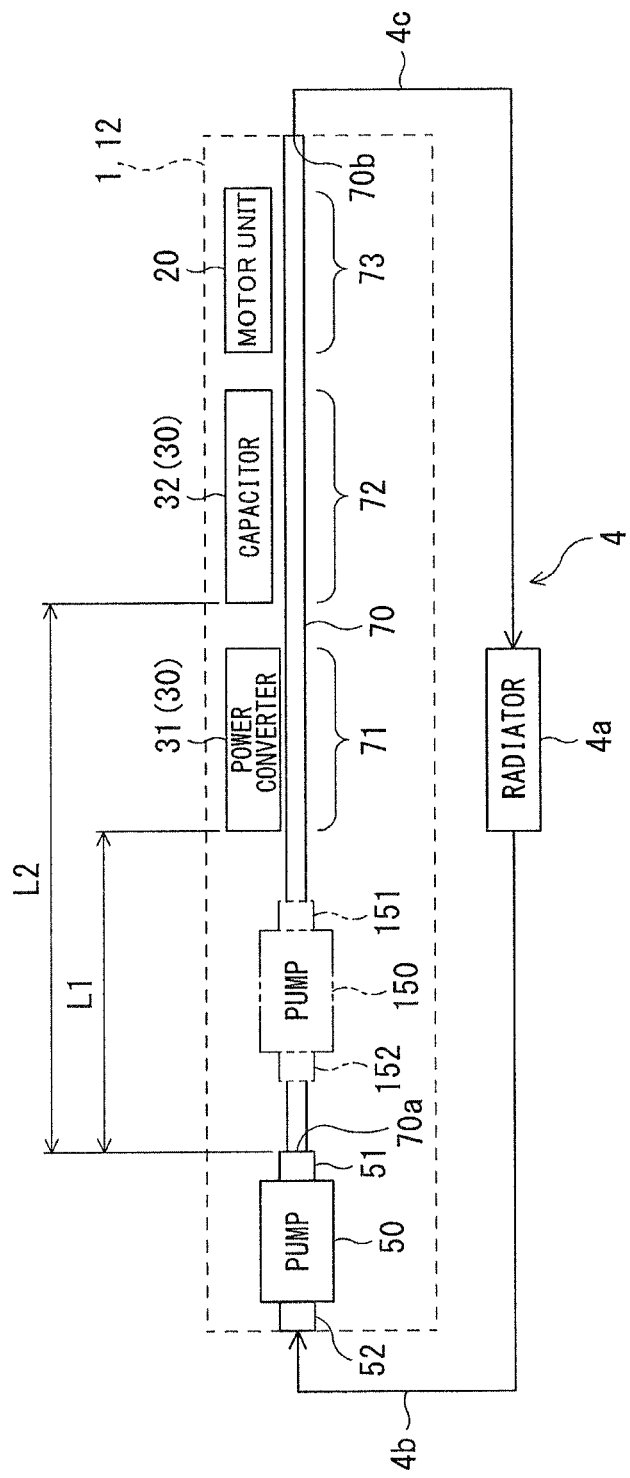
FIG. 1 is a block diagram illustrating the configurations of a motor apparatus for a vehicle according to an embodiment and a second modification, and a cooling device.

As illustrated in FIG. 1, the motor apparatus 1 according to this embodiment includes a motor unit 20 that generates power for driving the vehicle, and an inverter unit 30 that converts DC power supplied from the batteries (not illustrated) into AC power and that supplies the AC power to the motor unit 20. Since the motor unit 20 and the inverter unit 30 each generate heat due to electrical resistance, mechanical friction, and the like while operating, the motor apparatus 1 is equipped with a cooling device 4 for cooling each of the motor unit 20 and the inverter unit 30.

The cooling device 4 includes a radiator 4a, and an upstream passage 4b and a downstream passage 4c each connecting the radiator 4a with the motor apparatus 1 in series. The cooling device 4 cools the motor apparatus 1 by circulating a coolant (cooling medium) between the radiator 4a and the motor apparatus 1. The radiator 4a is a heat dissipater that removes heat from the coolant. Each of the upstream passage 4b and the downstream passage 4c is formed of a pipe(s) or a hose(s), for example, and functions as a path through which the coolant flows.

The coolant cooled by the radiator 4a of the cooling device 4 is supplied to the motor apparatus 1 through the upstream passage 4b, and after flowing out of the motor apparatus 1, flows through the downstream passage 4c into the radiator 4a again to be cooled. The motor unit 20 and the inverter unit 30 are cooled by the coolant flowing through a cooling passage 70 formed in the inside of the motor apparatus 1 and in the vicinity of the motor unit 20 and the inverter unit 30. In other words, the coolant cools the motor unit 20 and the inverter unit 30 while flowing through the cooling passage 70.

Figure 2:
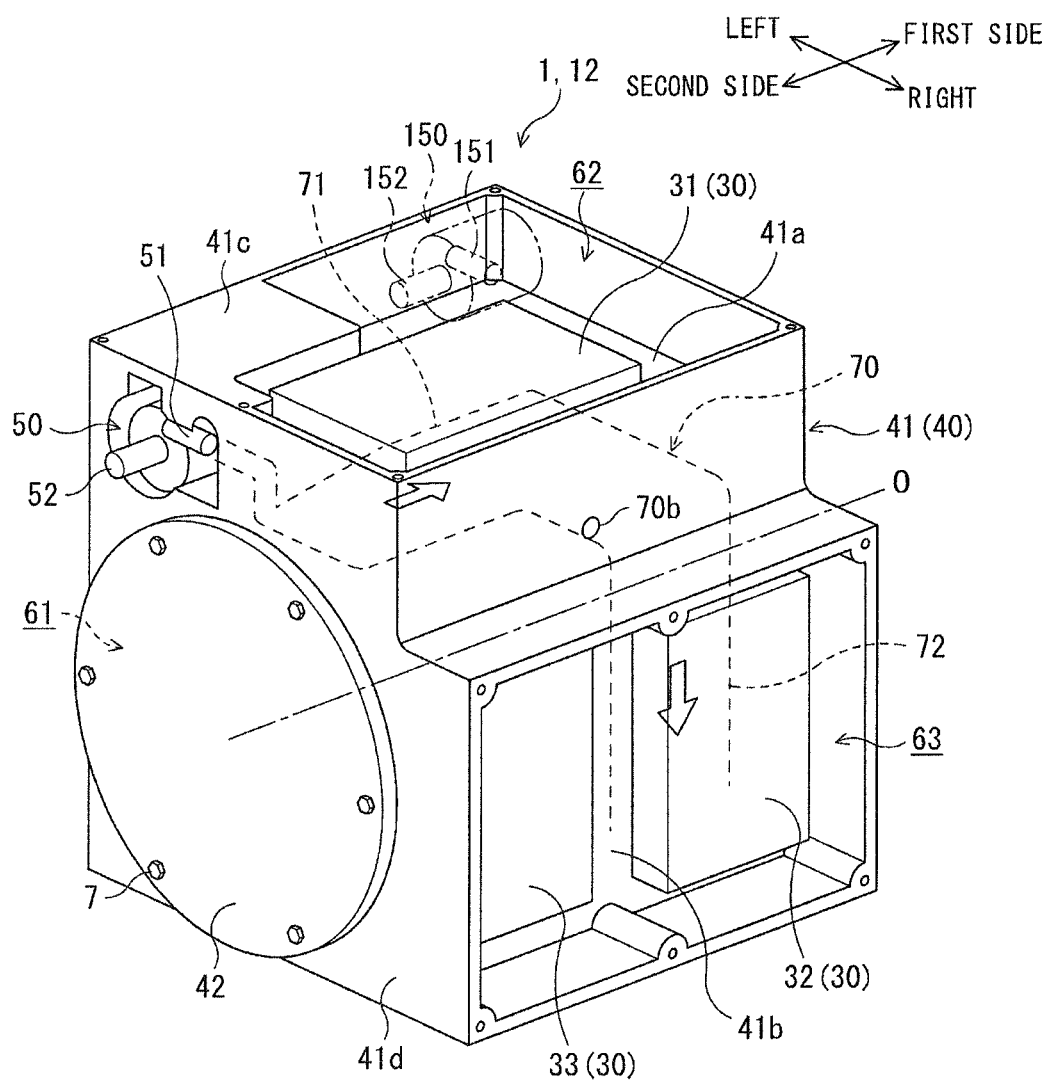
FIG. 2 is a schematic perspective view of the motor apparatus of FIG. 1, omitting a first lid and a second lid.
Figure 3:
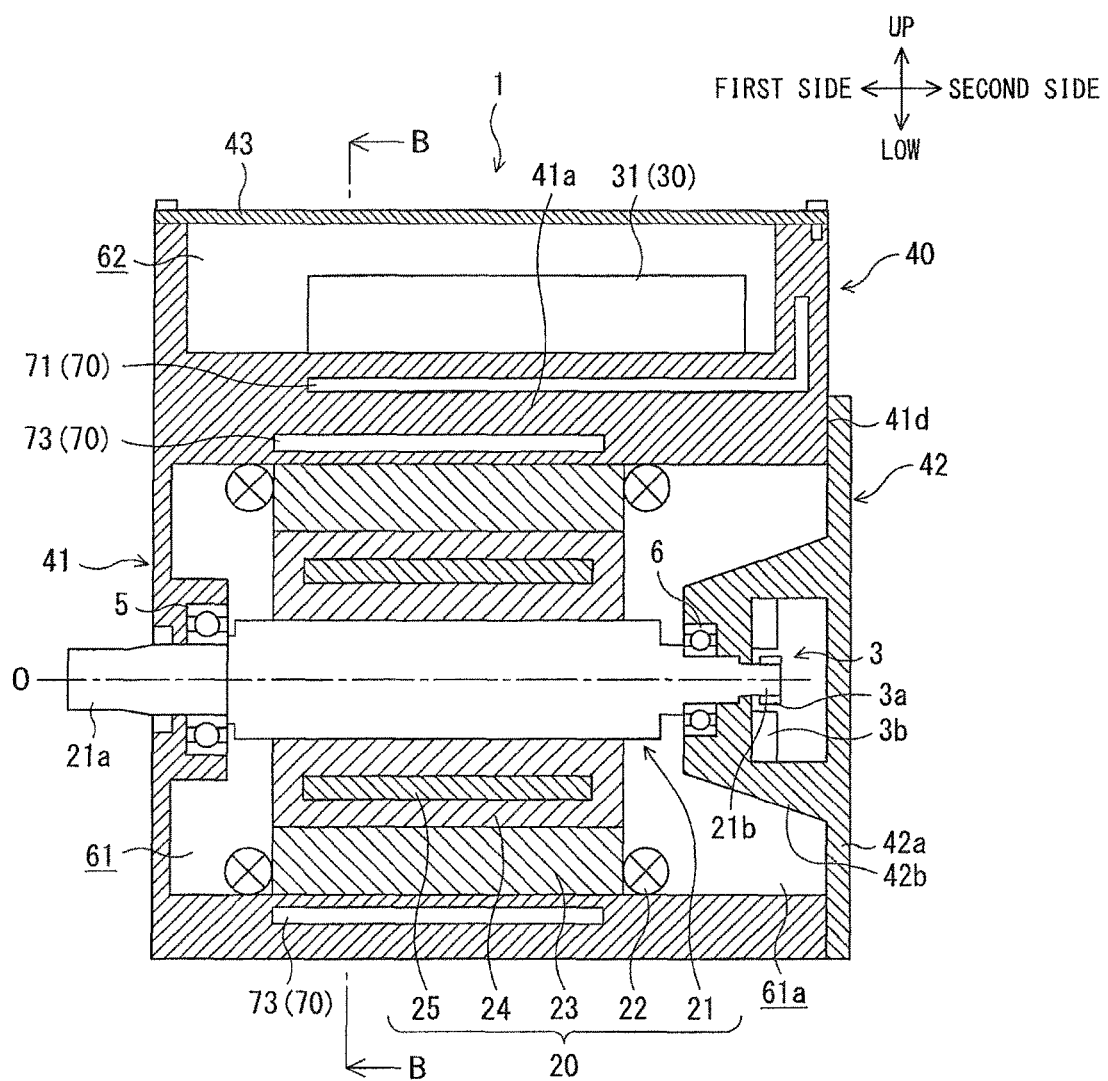
FIG. 3 shows a schematic longitudinal section of the motor apparatus of FIG. 1 seen from the direction of arrows A, A in FIG. 4.
Figure 4:
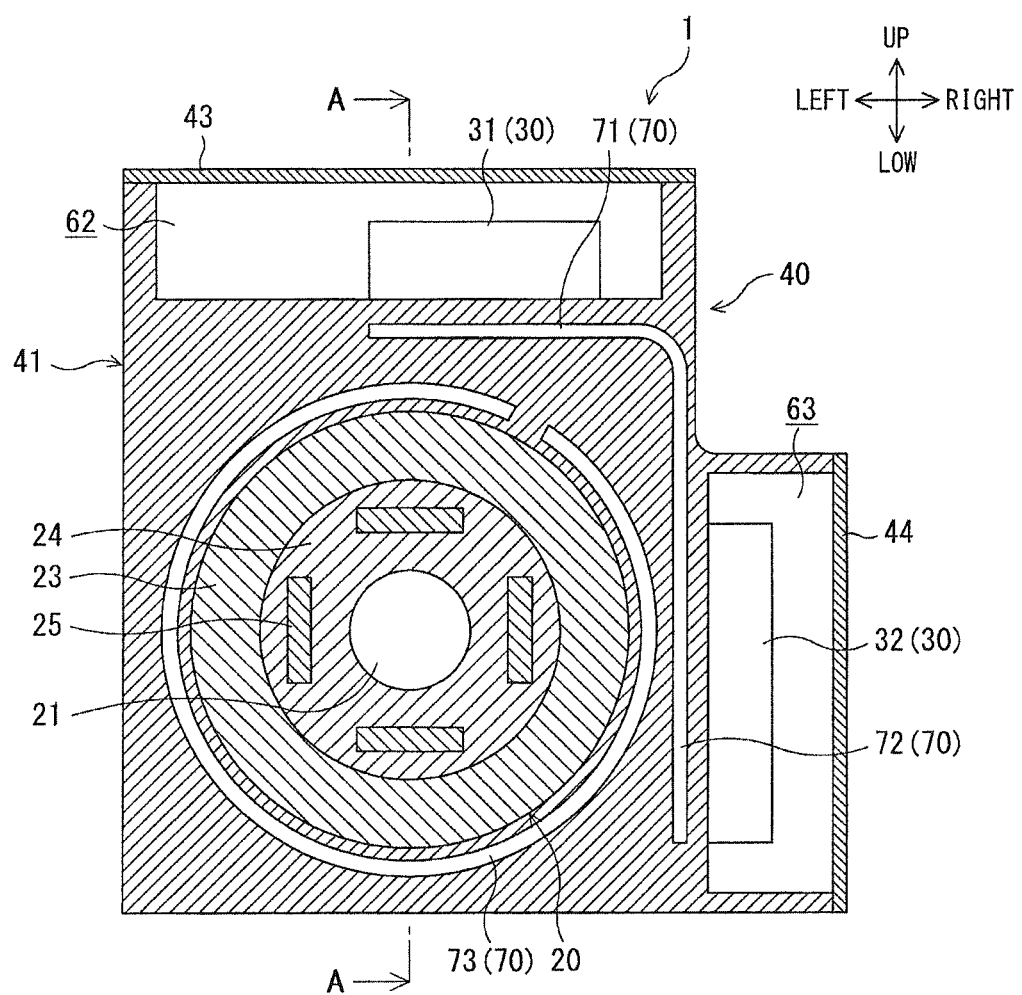
FIG. 4 shows a schematic longitudinal section of the motor apparatus of FIG. 1 seen from the direction of arrows B, B in FIG. 3.

Hereinafter, the configuration of the motor apparatus 1 is to be described. FIG. 2 is a perspective view of the motor apparatus 1, omitting a first lid 43 and a second lid 44 each to be described later. FIG. 3 shows a section of the motor apparatus 1 (seen from the direction of arrows A, A in FIG. 4), the section being imaginary cut across a vertical plane passing through a core axis O to be described below. FIG. 4 shows another section of the motor apparatus 1 (seen from the direction of arrows B, B in FIG. 3), the section being imaginary cut across a vertical plane perpendicular to the core axis O. FIGS. 3 and 4 each omit hatching that represents sectional surfaces for a shaft 21 of the motor unit 20, the inverter unit 30, a resolver 3, and bearings 5, 6 (each to be detailed later). In the following description, the gravitational direction is referred to as low direction, and the opposite direction of the gravitational direction is referred to as up direction. Further, the direction toward the core axis O is referred to as an inner side or inward, and the opposite direction of this is referred to as an outer side or outward. The motor apparatus 1 is to be mounted on the vehicle, keeping the orientation of the vertical direction illustrated in FIGS. 2 to 4.

As depicted in FIGS. 2 and 3, the motor apparatus 1 includes a case 40 and the pump 50 in addition to the motor unit 20 and the inverter unit 30. The case 40 has multiple rooms inside, and accommodates the motor unit 20 and the inverter unit 30. The pump 50 is fixed to the case 40. In this embodiment, the inverter unit 30 is accommodated in a room 62 (hereinafter, referred to as "first space 62") disposed at an upper portion of the inside of the case 40, and a room 63 (hereinafter, referred to as "second space 63") disposed at a side portion of the inside of the case 40, while the motor unit 20 is accommodated in a room 61 (hereinafter, referred to as "motor space 61") disposed below the first space 62 and horizontal to the second space 63. Namely, the case 40 of this embodiment has two rooms (inverter spaces), which are the first space 62 and the second space 63, each accommodating the inverter unit 30. Hereinafter, the first and second spaces 62, 63 are also called "inverter spaces 62, 63", collectively.

Firstly, the configuration of the inverter unit 30 is to be detailed. The inverter unit 30 is configured to operate using the power of the batteries as the power source, and to convert DC power supplied from the batteries into AC power (i.e. the inverter unit 30 is configured to generate AC power) for driving the motor unit 20, and to supply the AC power to the motor unit 20. The inverter unit 30 includes a power converter 31, a capacitor 32, and the control circuit 33. This embodiment assumes that the first space 62 accommodates the power converter 31 while the second space 63 accommodates both of the capacitor 32 and the control circuit 33. This means that the inverter unit 30 is dividedly accommodated in two different inverter spaces 62, 63.

The power converter 31 includes multiple switching elements, such as thyristors and transistors called IGBT (Insulated Gate Bipolar Transistor), and is configured to convert DC power into AC power by turning on and off the switching elements. The capacitor 32 is disposed on an electrical circuit connecting the batteries and the power converter 31, and is configured to smooth the DC power supplied from the batteries. The control circuit 33 takes the form of a control board, and is configured to control the on/off state of the switching elements included in the power converter 31.

Among the elements of the inverter unit 30, the power converter 31 and the capacitor 32, especially, tend to have elevated temperatures since each of the power converter 31 and the capacitor 32 generates large amount of heat due to large current flowing from the batteries. To deal with this inconvenience, as shown in FIG. 1, the cooling passage 70 (a first part 71 and a second part 72 each to be detailed later) is disposed in proximity to the power converter 31 and the capacitor 32 to cool the power converter 31 and the capacitor 32.

Next, the configuration of the motor unit 20 is to be detailed. The motor unit 20 is configured to generate rotational force to be transmitted to the wheels (not shown) by rotating a rotor with the AC power generated in the inverter unit 30. The motor unit 20 configures a three-phase AC motor. As illustrated in FIG. 3, the motor unit 20 includes the rotor constituted by the shaft 21 and a rotor core 24 being fixed to the periphery of the shaft 21 and having a magnet(s) 25 embedded in the rotor core 24. The motor unit 20 further includes a stator constituted by a number of stator cores 23 arranged along the circumference of the rotor core 24 at constant intervals, and coils 22 wound around the respective stator cores 23. Each of the stator cores 23 is fixed to an inner wall of the case 40, the inner wall surrounding the motor space 61.

The shaft 21 of this embodiment is disposed so as to have the core axis O extending horizontally, and is rotatably supported by two bearings 5, 6 each fixed to the case 40. A first end 21a (the left end in FIG. 3) of the shaft 21 protrudes outside the case 40, and is connected to an axle via a gear box (not illustrated), for example. The other end or a second end 21b (the right end in FIG. 3) of the shaft 21 is received in a bulge portion 42b (to be described later) disposed in the motor space 61. The second end 21b is equipped with the resolver 3 (rotation angle sensor) for detecting a rotational angle of the shaft 21. Hereinafter, along the direction of the core axis O of the shaft 21, the side on which the first end 21a of the shaft 21 is disposed is also referred to as "first side", whereas the side on which the second end 21b is disposed is also referred to as "second side".

The resolver 3 includes a rotor 3a, a stator 3b, and output terminals (not illustrated). The resolver 3 is configured to output the rotational angle of the rotor 3a with respect to the stator 3b via the output terminals to a controller (not shown). The rotor 3a of the resolver 3 is fixed to the periphery of the second end 21b of the shaft 21 in a rotatable manner with respect to the stator 3b, and is rotatable together with the shaft 21. The stator 3b of the resolver 3 is disposed at the periphery of the rotor 3a, and is fixed to the bulge portion 42b.

Next, the configuration of the case 40 is to be described. As illustrated in FIGS. 2 to 4, the case 40 is a box-shaped member having an appearance of a large cuboid combined with a small cuboid, the small cuboid attaching to a side face of the large cuboid and having a base flush with a base of the large cuboid. The case 40 is constituted by a body 41, a side lid 42, the first lid 43, and the second lid 44.

The body 41, which is the main part of the case 40, has an rectangular top face (corresponding to the top face of the large cuboid) partially opened (specifically, the part other than a pump accommodating portion 41c to be described below is opened), and has an entire rectangular side face (corresponding to the side face of the small cuboid and being parallel to the core axis O) opened. Hereinafter, as shown in FIGS. 2 and 4, along the horizontal direction perpendicular to the core axis O of the shaft 21, the side of the opened side face is also referred to as "right side", whereas the opposite side is also referred to as "left side".

The body 41 includes a first partition wall 41a (wall) extending along a horizontal plane at a height slightly lower than the height of the top edge of the body 41, and a second partition wall 41b (wall) extending along a vertical plane slightly inside the right edge of the body 41. The internal space of the body 41 is vertically separated into two rooms 61, 62 by the first partition wall 41a, and is also horizontally (along the left and right directions) separated into two rooms 61, 63 by the second partition wall 41b. Namely, the inverter spaces 62, 63 are provided adjacent to the motor space 61 via the respective walls 41a, 41b. The body 41 has a hole formed on a side wall at the first side along the shaft 21, through which the hole the first end 21a of the shaft 21 is disposed. The body 41 also has an opening shaped in a substantial circle and formed on a side wall 41d at the second side along the shaft 21. The hole and the opening of the body 41 are formed on respective parts of the side walls, the parts surrounding the motor space 61.

The body 41 further has the pump accommodating portion 41c into which the pump 50 is fit and fixed. The pump accommodating portion 41c is provided at a corner obliquely upward of the opening seen from the second side, the corner corresponding to the upper left corner (i.e., the top part of the corner formed by the side wall on the left and the side wall 41d on the second side). The pump accommodating portion 41c of this embodiment is a recess dented inwardly from the side wall 41d on the second side along the core axis O, and has a shape conforming to the outer shape of the pump 50. The top face of the pump accommodating portion 41c is a smooth horizontal plane continued from the top edge of the body 41. The pump accommodating portion 41c is provided with an opening (not shown) that is located in correspondence to a discharging part 51 (to be described later) of the pump 50 and that composes an upstream end 70a of the cooling passage 70.

As illustrated in FIGS. 3 and 4, the first lid 43 is a cover that closes the opened top face of the body 41, and after being fixed to the top edge of the body 41 and to the top face of the pump accommodating portion 41c by bolts (not shown), composes a top wall of the case 40. The second lid 44 is a cover that closes the opened side face of the body 41, and after being fixed to the right edge of the body 41 by bolts (not shown), composes a side wall of the case 40. The side lid 42 is a cover that closes the opening of the body 41, and after being fixed to the side wall 41d on the second side of the body 41 by multiple (in FIG. 2, six) bolts 7, composes a side wall of the case 40 in cooperation with the side wall 41d on the second side of the body 41.

The first lid 43 demarcates, in cooperation with the body 41, the first space 62 that accommodates the power converter 31 of the inverter unit 30. The second lid 44 demarcates, in cooperation with the body 41, the second space 63 that accommodates the capacitor 32 and the control circuit 33 of the inverter unit 30. The side lid 42 demarcates, in cooperation with the body 41, the motor space 61 that accommodates the motor unit 20.

The first space 62 of this embodiment is formed in a substantial L-shape when seen from the top, and has a nearly uniform height (the length in vertical direction). The power converter 31 of the inverter unit 30 is disposed in the first space 62, and is spaced apart from the pump accommodating portion 41c. The power converter 31 is fixed to an upper face of the first partition wall 41a that separates the first space 62 from the motor space 61.

In contrast, the second space 63 of this embodiment is formed in a substantial cuboid, and has a nearly uniform depth (the length in horizontal direction). The capacitor 32 and the control circuit 33 of the inverter unit 30 are disposed in the second space 63, and are spaced apart from each other. The capacitor 32 and the control circuit 33 are each fixed to a right face of the second partition wall 41b that separates the second space 63 from the motor space 61. In this embodiment, the capacitor 32 is disposed on the second side, while the control circuit 33 is disposed on the first side.

The motor space 61 of this embodiment has a cylinder-like shape having an axis extending horizontally. The motor unit 20 is accommodated in the motor space 61 in such a manner that the core axis O of the motor unit 20 substantially coincides with the axis of the motor space 61. The inner diameter of the motor space 61 is set slightly larger than the diameter of the motor unit 20 with the center at the core axis O. The length of the motor space 61 along the axis direction is set to the sum of the length of the space where the resolver 3 is disposed and the lengths of the rotor core 24, the stator core 23, and the coil 22 of the motor unit 20 along the axis direction. Namely, the motor space 61 provides a room 61a (hereinafter, referred to as "surrounding space 61a") for accommodating the resolver 3 on the second side. The side lid 42 is placed in the surrounding space 61a.

The side lid 42 has a circular plate portion 42a formed in a disc shape, and the bulge portion 42b protruding from the center of the circular plate portion 42a in a substantial truncated cone shape. The circular plate portion 42a has a diameter slightly larger than the inner diameter of the motor space 61. The circular plate portion 42a is fixed to the body 41 from the outside of the motor space 61, and closes the opening of the body 41. In contrast, the bulge portion 42b is placed in the surrounding space 61a of the motor space 61.

The bulge portion 42b is provided for pivotally supporting the shaft 21 and for fixing the resolver 3, and is disposed coaxially with the core axis O. The bulge portion 42*b* fixes thereto the stator 3*b* of the resolver 3 and the bearing 6 that rotatably supports the shaft 21. The bulge portion 42*b* has an outer diameter slightly larger than the outer diameter of the resolver 3 and sufficiently smaller than the inner diameter of the motor space 61.

The case 40 has, in addition to the rooms that respectively function as the motor space 61 and the inverter spaces 62, 63, the cooling passage 70 formed in the inside of the walls surrounding the rooms 61, 62, 63. The coolant forwarded by the pump 50 flows into the cooling passage 70.

As depicted in FIG. 2, the pump 50 is an electric water pump, for example, and has a suctioning part 52 that draws the coolant into the pump 50, a discharging part 51 that forwards the coolant drawn by the suctioning part 52 to the cooling passage 70, and a connection part (not shown) connected to an electric power source. The suctioning part 52 projects outside the case 40, whereas the discharging part 51 protrudes from a side face of the pump 50, and is disposed at an inner side with respect to the outer face of the case 40. The connection part protrudes from the side face of the pump 50 towards the opposite side of the discharging part 51, and is wired through a hole (not illustrated) formed on the left wall of the body 41.

The pump 50 is fit into the pump accommodating portion 41*c* from outside the case 40, being oriented such that the discharging part 51 points to the right. Namely, the pump 50 is integrated in the case 40. The suctioning part 52 is disposed outside the case 40, and protrudes in a direction parallel to the core axis O. In contrast, the discharging part 51 is accommodated in the pump accommodating portion 41*c*, and is disposed inward from the outer face of the case 40.

The cooling passage 70 functions as a flow path of the coolant (in other words, the cooling passage 70 is configured to let the coolant flow through the cooling passage 70) in the inside of the motor apparatus 1, and is formed in the inside of the walls including the first partition wall 41*a* and the second partition wall 41*b*. The cooling passage 70 of this embodiment takes the form of a single flow path being continuous from the upstream end 70*a* opening at the pump accommodating portion 41*c* to a downstream end 70*b* opening at a right side face (i.e., the side face above the second space 63) of the body 41 as illustrated in FIG. 2. It should be noted that the position of the downstream end 70*b* is not particularly limited.

As illustrated in FIGS. 1 to 4, the cooling passage 70 includes the first cooling part 71 for cooling the power converter 31, the second cooling part 72 for cooling the capacitor 32, and a third cooling part 73 for cooling the motor unit 20. The first cooling part 71 takes a shape of a horizontal face extending in parallel with the bottom face of the power converter 31 in the inside of the first partition wall 41*a*, so as to conform to the surface shape of the power converter 31. Further, the second cooling part 72 takes a shape of a vertical face extending in parallel with the side face of the capacitor 32 in the inside of the second partition wall 41*b*, so as to conform to the surface shape of the capacitor 32. In this embodiment, as depicted in FIG. 3, the first cooling part 71 is formed in the inside of the first partition wall 41*a* and close to the upper surface of the first partition wall 41*a*. Further, as depicted in FIG. 4, the second cooling part 72 is formed in the inside of the second partition wall 41*b* and at the right side (outer side) within the second partition wall 41*b*.

The third cooling part 73 is formed in a cylindrical shape extending in the inside of the wall surrounding the motor space 61 of the body 41 along the circumference of the motor unit 20. In this embodiment, the upper portion of the third cooling part 73 is formed in the inside of the first partition wall 41*a*, close to the lower surface of the first partition wall 41*a*, and vertically below the first cooling part 71. The right portion of the third cooling part 73 is formed in the inside of the second partition wall 41*b*, at the left side (inner side) within the second partition wall 41*b*, and to the left of the second cooling part 72.

The upstream end 70*a* of the cooling passage 70 is positioned at a relatively high position in the case 40 because the pump 50 is disposed at the top of the body 41 (above the motor unit 20). This means that the coolant flowing into the upstream end 70*a* has high potential energy, so that the coolant flows down into the cooling passage 70 with the help of gravity in addition to the discharging pressure applied by the pump 50. Further, since the power converter 31 of the inverter unit 30 is arranged above the motor space 61 while the pump 50 is arranged at the top of the body 41, the distance between the pump 50 and the power converter 31 is shortened. Consequently, as shown in FIG. 1, the length (path length) L1 of the cooling passage 70 from the discharging part 51 of the pump 50 to the first cooling part 71 is shortened.

The upstream end 70*a* of the cooling passage 70 is connected to the discharging part 51 of the pump 50, while the downstream end 70*b* of the cooling passage 70 is connected to the downstream passage 4*c* of the cooling device 4. In the cooling passage 70, the first cooling part 71, the second cooling part 72, and the third cooling part 73 are provided in this order from upstream to downstream. Namely, the first, the second, and the third cooling parts 71, 72, 73 of this embodiment are arranged in series, and the second cooling part 72 is provided downstream of the first cooling part 71 with respect to the discharging part 51 of the pump 50 (in other words, the second cooling part 72 is provided downstream of the first cooling part 71 when seen from the discharging part 51). This makes the cooling passage 70 have the length L1 from the discharging part 51 to the first cooling part 71 shorter than the length L2 from the discharging part 51 to the second cooling part 72. As a result, the coolant forwarded from the discharging part 51 reaches the first cooling part 71 before reaching the second cooling part 72.

Thus, the coolant cooled by the radiator 4*a* is forwarded to the cooling passage 70 by the pump 50, and firstly cools the power converter 31 while flowing through the first cooling part 71. The coolant secondly cools the capacitor 32 while flowing through the second cooling part 72, thirdly cools the motor unit 20 while flowing through the third cooling part 73, and then flows through the downstream end 70*b* to be ejected to the downstream passage 4*c*. As described above, the coolant immediately after passing the radiator 4*a* and having the lowest temperature is supplied to the first cooling part 71 before being supplied to the second cooling part 72 and the third cooling part 73. This enhances the cooling performance especially for the power converter 31.

2. Advantageous Effects (1) According to the motor apparatus 1 described above, two inverter spaces 62, 63 are provided adjacent to the motor space 61 via the respective walls 41*a*, 41*b*, and the first space 62 accommodates the power converter 31 while the second space 63 accommodates the capacitor 32 and the control circuit 33. With this configuration, components likely to have increased temperatures are parted, so that heat dissipation of the inverter unit 30 can be enhanced.

In addition, regarding the cooling passage 70, since the length L1 of the cooling passage 70 from the discharging part 51 of the pump 50 to the first cooling part 71 is shorter than the length L2 of the cooling passage 70 from the discharging part 51 to the second cooling part 72, the resistance that acts on the coolant flowing from the discharging part 51 to the first cooling part 71 becomes smaller than the resistance that acts on the coolant flowing from the discharging part 51 to the second cooling part 72. This can make the cooling performance for the power converter 31 higher than the cooling performance for the capacitor 32.

Accordingly, it is possible to enhance the cooling performance for the power converter 31, which tends to have a temperature higher than a temperature of the capacitor 32. Thus, it is possible to cool the inverter unit 30 efficiently, enhancing the cooling performance. Consequently, overheating of the motor apparatus 1 can be suppressed, and the performance and the reliability of the motor apparatus 1 can be enhanced.

(2) According to the motor apparatus 1 described above, since the power converter 31 and the capacitor 32 are accommodated in the respective inverter spaces 62, 63, the power converter 31 and the capacitor 32, which particularly tend to become hot, can be disposed dividedly, enhancing the heat dissipation of the both. As a result, the cooling performance for the inverter unit 30 can be enhanced.

(3) According to the motor apparatus 1 described above, partly since the pump 50 is arranged above the motor unit 20 when being installed in the vehicle, and partly since the power converter 31 is accommodated in the first space 62 disposed above the motor space 61, the distance between the pump 50 and the power converter 31 can be shortened. This makes it possible to shorten the length L1 of the cooling passage 70 from the discharging part 51 to the first cooling part 71. Accordingly, it is possible to further reduce the resistance that acts on the coolant flowing from the discharging part 51 to the first cooling part 71. As a result, the first cooling part 71 can be supplied with the coolant having a far lower temperature. Thus, the cooling performance for the inverter unit 30 can be further enhanced.

In Addition, since the pump 50 can be positioned relatively high, it is possible to elevate the potential energy of the coolant to be forwarded to the cooling passage 70. This makes gravity promote the flow of the coolant when the coolant flows downwardly through the cooling passage 70, for example, and thereby the cooling performance can be enhanced. Additionally, since the pump 50 can be positioned away from the road, the pump 50 can be protected from stones bouncing from the road.

(4) According to the motor apparatus 1 described above, since the pump 50 is disposed in the case 40, the coolant can be forwarded directly to the cooling passage 70 from the discharging part 51 of the pump 50, resulting in reduction in resistance (flow resistance) that acts on the coolant. Accordingly, the motor apparatus 1 can enhance the cooling performance for the motor unit 20 and the inverter unit 30. Because of this, by reducing the size of the pump 50, for example, it is possible to cut down the cost and the weight of the motor apparatus 1 while keeping the cooling performance equivalent to that of the conventional apparatus.

3. Modifications 3-1. First Modification

Figure 5:
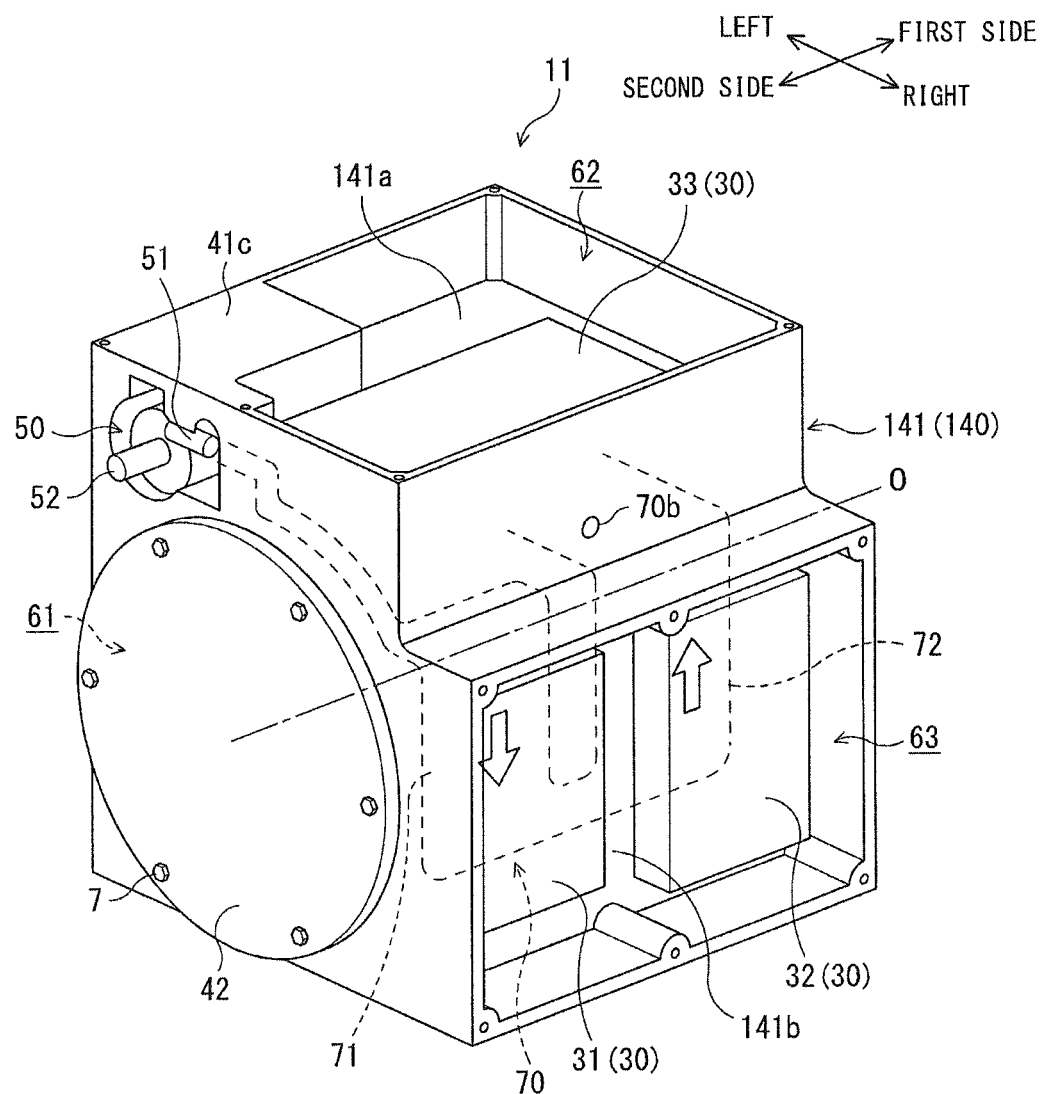
FIG. 5 is a schematic perspective view of a motor apparatus for a vehicle according to a first modification, omitting a first lid and a second lid.

Next, a motor apparatus 11 according to a first modification will now be described with reference to FIG. 5. The directions (i.e. the first and second sides, and the right and left sides) defined in the above embodiment also apply to the motor apparatus 11 of FIG. 5. Like reference numbers in FIG. 5 designate the same or similar parts described in the above embodiment, so repetitious description is omitted here.

The motor apparatus 11 according to this modification differs from the motor apparatus 1 according to the above embodiment in the arrangements of the elements 31-33 of the inverter unit 30 and the parts 71-73 of the cooling passage 70 (i.e., the inner structure of the walls of the case 40), but has other configurations common to those of the motor apparatus 1 according to the above embodiment. As depicted in FIG. 5, this modification assumes that the first space 62 accommodates the control circuit 33 of the inverter unit 30 while the second space 63 accommodates both of the power converter 31 and the capacitor 32. This means that the control circuit 33 is accommodated in the room 62 different from the room 63 accommodating the power converter 31 and the capacitor 32.

In response to this modified arrangement of the elements 31-33 of the inverter unit 30, a case 140 according to this modification differs from the case 40 of the above embodiment, in an arrangement of the cooling passage 70 formed in the inside of the walls. Specifically, a body 141 of the case 140 according to this modification includes a first partition wall 141a (wall) that separates the first space 62 from the motor space 61 and a second partition wall 141b (wall) that separates the second space 63 from the motor space 61. Each of the partition walls 141a, 141b has an inner structure different from those of the respective walls 41a, 41b of the above embodiment, but has other structures common to those of the respective walls 41a, 41b of the above embodiment.

The control circuit 33 is disposed in the first space 62, is spaced apart from the pump accommodating portion 41c, and is fixed to the upper face of the first partition wall 141a. In contrast, the power converter 31 and the capacitor 32 are disposed in the second space 63, are spaced apart from each other, and are each fixed to the right face of the second partition wall 141b of the case 140. In this modification, the power converter 31 is disposed on the second side, while the capacitor 32 is disposed on the first side.

This modification assumes that the first and second cooling parts 71, 72 of the cooling passage 70 are both formed in the inside of the second partition wall 141b. The arrangement of the third cooling part 73 of the cooling passage 70 is similar to that of the above embodiment.

According to the motor apparatus 11 of this modification, since the control circuit 33 is accommodated in the first space 62 different from the second space 63 accommodating the power converter 31 and the capacitor 32, the control circuit 33 can be disposed away (dividedly) from the power converter 31 and the capacitor 32 each tending to have an elevated temperature. This can suppress an increase in temperature of the control circuit 33 due to the heat transferring from the power converter 31 and/or the capacitor 32 to the control circuit 33.

Further, according to the motor apparatus 11 of this modification, similar operations and advantageous effects can be achieved by the same or similar configurations to those of the above embodiment.

3-2. Second Modification

Next, a motor apparatus 12 according to a second modification will now be described with reference to FIGS. 1 and 2, again. Here as well, the directions (i.e. the first and second sides, and the right and left sides) defined in the above embodiment apply to the motor apparatus 12, and like reference numbers designate the same or similar parts described in the above embodiment, so repetitious description is omitted.

The motor apparatus 12 according to this modification adds a pump 150 to the motor apparatus 1 of the above embodiment, and in response to this, applies a partially modified configuration in the cooling passage 70. It should be noted that FIGS. 1 and 2 each illustrate the pump 150 by two-dot chain lines and omit the modified part of the cooling passage 70. Namely, the motor apparatus 12 of this modification differs from the motor apparatus 1 of the above embodiment in the number of the pump 50 and the partial configuration of the cooling passage 70, but has, other configurations common to those of the motor apparatus 1 according to the above embodiment.

As depicted in FIGS. 1 and 2, the motor apparatus 12 according to this modification includes two pumps 50, 150 each disposed within the case 40. The pump 150, as shown in FIG. 1 by the two-dot chain lines, is disposed on the cooling passage 70, and is serially connected to the pump 50 at the immediate downstream of the pump 50. This means that the pump 150 is arranged between the pump 50 and the first cooling part 71 on the cooling passage 70. This causes the coolant forwarded from the discharging part 51 of the pump 50 to be supplied to each of the cooling parts 71-73 after being further pressurized by the pump 150.

Thus, the coolant cooled by the radiator 4a is forwarded to the cooling passage 70 by the pump 50, then is further pressurized by the pump 150, and cools the power converter 31 while flowing through the first cooling part 71. Accordingly, the first cooling part 71 is supplied with the coolant at a high discharging rate (per unit time), which is increased by the two pumps 50, 150.

FIG. 2 illustrates the arrangement of the pump 150 by the two-dot chain lines. The pump 150 has a suctioning part 152 that draws the coolant forwarded to the cooling passage 70 by the pump 50 into the pump 150, and a discharging part 151 that forwards the coolant drawn by the suctioning part 152 to the first cooling part 71. The suctioning part 152 and the discharging part 151 of the pump 150 are both disposed within the case 40.

The pump 150 of this modification is fixed to an upper left corner (i.e., the top part of the corner formed by the side wall on the left and the side wall on the first side) of the body 41. Accordingly, the coolant forwarded to the first cooling part 71 by the pump 150 has high potential energy, so that the coolant flows down into the cooling passage 70 with the help of gravity in addition to the discharging pressure applied by the pump 150. Although the pump 150 may be fixed in various manners, the pump 150 of this modification is fit into and fixed to a pump accommodating portion (not shown) provided in the body 41 of the case 40, in a similar way to that of the pump 50 of the above embodiment, for example.

According to the motor apparatus 12 of this modification, since two pumps 50, 150 are provided and connected to each other in series on the cooling passage 70, the discharging rate can be increased, further enhancing the cooling performance. In addition, since the pumps 50, 150 are both disposed within the case 40, the coolant discharged by the pumps 50, 150 can be forwarded directly to the cooling passage 70, resulting in reduction in resistance that acts on the coolant. Accordingly, the cooling performance for the motor unit 20 and the inverter unit 30 can be enhanced. Further, by providing two pumps 50, 150 instead of one pump having a large displacement within the case 40, it is possible to increase the discharging rate of the coolant while enhancing the freedom of arrangements of components.

Further, according to the motor apparatus 12 of this modification, similar operations and advantageous effects can be achieved by the same or similar configurations to those of the above embodiment.

3-3. Third Modification

Next, a motor apparatus 13 according to a third modification will now be described with reference to FIG. 6. Here as well, like reference numbers designate the same or similar parts described in the above embodiment, so repetitious description is omitted.

The motor apparatus 13 according to this modification differs from the motor apparatus 1 according to the above embodiment in the configuration of the cooling passage 70, but has other configurations common to those of the motor apparatus 1 according to the above embodiment. Hereinafter, the description will be made with regard to a cooling passage 170 of the motor apparatus 13 according to this modification.

Figure 6:
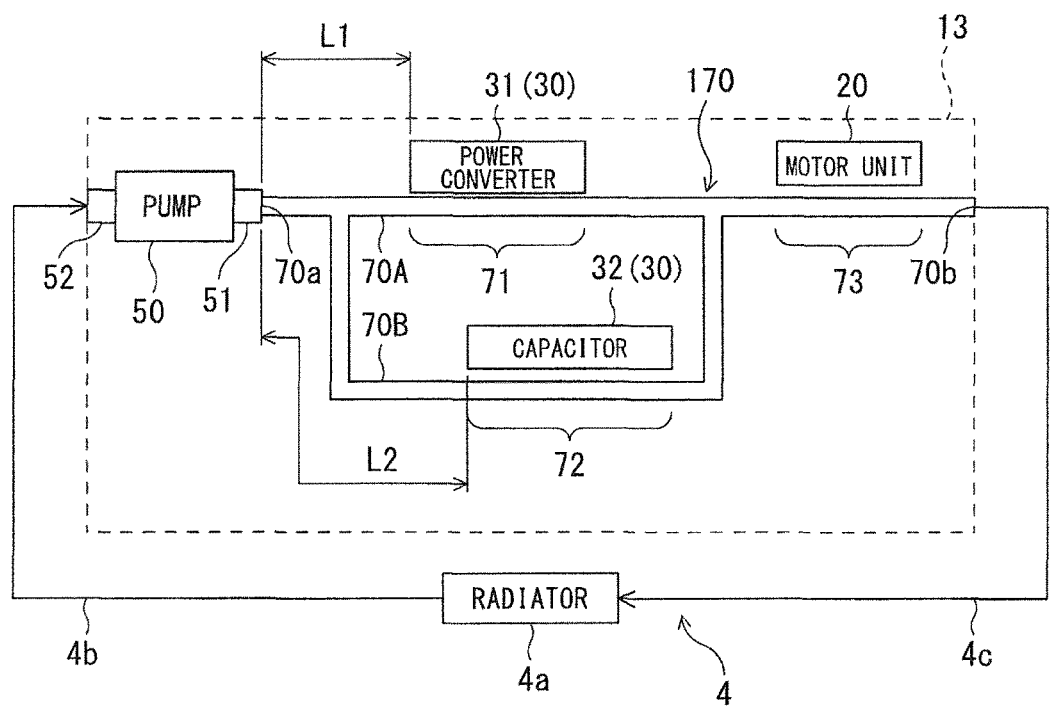
FIG. 6 is a block diagram illustrating configurations of a motor apparatus for a vehicle according to a third modification and a cooling device.

As illustrated in FIG. 6, the cooling passage 170 differs from the cooling passage 70 of the above embodiment in a configuration that the first and second cooling parts 71, 72 are disposed parallel to each other, but applies other configurations common to those of the cooling passage 70 of the above embodiment. Specifically, the cooling passage 170 according to this modification includes a first cooling path 70A extending continuously from the upstream end 70a to the downstream end 70b, and a second cooling path 70B diverging from the first cooling path 70A and merging again into the first cooling path 70A at a downstream position. The second cooling path 70B is a flow path that diverges from the first cooling path 70A between the upstream end 70a and the first cooling part 71, and that merges again into the first cooling path 70A between the first cooling part 71 and the third cooling part 73.

In the first cooling path 70A, the first cooling part 71 and the third cooling part 73 are provided in this order from upstream to downstream. In the second cooling path 70B, the second cooling part 72 is provided.

In this modification, the first and second cooling paths 70A, 70B are formed so as to have the length L1 of the cooling passage 170 from the discharging part 51 of the pump 50 to the first cooling part 71 shorter than the length L2 of the cooling passage 170 from the discharging part 51 to the second cooling part 72. Alternatively, the pump 50 may be arranged so as to satisfy the above relationship of the lengths (L1<L2). Consequently, according also to the motor apparatus 13 of this modification, the coolant forwarded by the discharging part 51 of the pump 50 firstly reaches the first cooling part 71. This can enhance the cooling performance for the power converter 31, which particularly tends to have an increased temperature, in a similar way to the above embodiment, achieving similar operations and advantageous effects to those of the above embodiment.

3-4. Other Modifications

Although the cooling medium exemplified in the above embodiment and modifications is the coolant, other cooling medium applicable to the motor apparatus 1, 11, 12, 13 may be water, antifreeze liquid, cooling oil, or air, for example.

Further, the positions, the structures, and the number of the pumps 50, 150 may be changed. The positions of the pumps 50, 150 are not limited to the upper left corners of the case 40, that is, the pumps 50, 150 may alternatively be fixed to a lower or right side of the case 40, or to an outer face of the case 40, for example. As another example, the pumps 50, 150 may be disposed away from the case 40, and may be connected to the cooling passage 70, 170 within the case 40 via pipes, hoses, or the like. The displacements of the pumps 50, 150 are not particularly limited, and may be set in response to the arrangement of components within the case 40, for example. Further, three or more pumps 50, 150 may be provided on the cooling passages 70, 170.

The pumps 50, 150 may be fixed in various manners, that is, the pumps 50, 150 may include flange parts for attaching the pumps 50, 150, and may be fixed to the case 40 at the flange parts, for example. According to this example, the pump accommodating portion 41c can be omitted.

The shape of the case 40, and the shapes and the positions of the motor space 61 and the inverter spaces 62, 63 are not limited to those of the above. The motor space and the inverter spaces may each be shaped in a substantial cuboid, or may be aligned horizontally, for example. Further, the above arrangements of each element 31-33 of the inverter unit 30 are merely examples, and may be modified. For example, in the second space 63, the power converter 31 or the control circuit 33 may be disposed on the first side while the capacitor 32 may be disposed on the second side, and alternatively, the power converter 31 or the control circuit 33, and the capacitor 32 may be aligned vertically. As another example, the first space 62 may accommodate the capacitor 32, and the second space 63 may accommodate both of the power converter 31 and the control circuit 33. Alternatively, three inverter spaces may be provided in the case 40 to accommodate the power converter 31, the capacitor 32, and the control circuit 33 individually.

The routes of the respective cooling passages 70, 170 illustrated in FIGS. 1 and 6 are not specifically limited as long as the length L1 from the discharging part 51 of the pump 50 to the first cooling part 71 is shorter than the length L2 from the discharging part 51 to the second cooling part 72. The cooling passages 70, 170 may include another cooling part for cooling the control circuit 33 of the inverter unit 30, for example. Further, the second cooling path 70B of the cooling passage 170 may include the third cooling part 73, or the first cooling path 70A may further be diverged so as to arrange the cooling parts 71-73 parallel to one another.

Although the above embodiment and modifications each illustrates the motor unit 20 disposed such that the core axis O of the shaft 21 extends horizontally, the extending direction of the core axis O of the shaft 21 is not limited to a horizontal direction, and may be changed.

Further, the rotation angle sensor fixed to the shaft of the motor apparatus is not limited to the above resolver 3, and may alternatively be a rotary encoder, for example. The invention thus described, it will be obvious that the same may be varied in many ways. Such variations are not to be regarded as a departure from the purpose and scope of the invention, and all such modifications as would be obvious to one skilled in the art are intended to be included within the scope of the following claims.

REFERENCE SIGNS LIST 1, 11, 12, 13 motor apparatus (motor apparatus for vehicle)
20 motor unit
30 inverter unit
31 power converter
32 capacitor
33 control circuit
40, 140 case
41a, 141a first partition wall (wall)
41b, 141b second partition wall (wall)
50, 150 pump
51, 151 discharging part
61 motor space
62 first space (inverter space)
63 second space (inverter space)
70, 170 cooling passage
71 first cooling part
72 second cooling part
73 third cooling part

What is claimed is:

1. A motor apparatus for a vehicle, the motor apparatus comprising:
a motor unit configured to generate power for driving the vehicle;
an inverter unit including a capacitor configured to smooth DC power, a power converter having a plurality of switching elements, and a control circuit configured to control the power converter;
a case having a motor space, two or more inverter spaces, and a cooling passage, the motor space accommodating the motor unit, each of the inverter spaces accommodating the inverter unit, the cooling passage being configured to let cooling medium flow through the cooling passage to cool the motor unit and the inverter unit; and
at least one pump configured to forward the cooling medium to the cooling passage,
wherein:
the inverter spaces are provided adjacent to the motor space via respective walls, and each accommodating at least one of the capacitor, the power converter, and the control circuit; and
the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

2. The motor apparatus according to claim 1, wherein the capacitor and the power converter are accommodated in the respective inverter spaces.

3. The motor apparatus according to claim 2, wherein:
the pump is arranged above the motor unit when being installed in the vehicle; and
the power converter is accommodated in the inverter space disposed above the motor space.

4. The motor apparatus according to claim 3, wherein the control circuit is accommodated in the inverter space different from the inverter space or spaces accommodating the power converter and the capacitor.

5. The motor apparatus according to claim 4, comprising two of the pumps disposed within the case and connected to each other in series on the cooling passage.

6. The motor apparatus according to claim 3, comprising two of the pumps disposed within the case and connected to each other in series on the cooling passage.

7. The motor apparatus according to claim 2, wherein the control circuit is accommodated in the inverter space different from the inverter space or spaces accommodating the power converter and the capacitor.

8. The motor apparatus according to claim 7, comprising two of the pumps disposed within the case and connected to each other in series on the cooling passage.

9. The motor apparatus according to claim 2, comprising two of the pumps disposed within the case and connected to each other in series on the cooling passage.

10. The motor apparatus according to claim 1, wherein:
the pump is arranged above the motor unit when being installed in the vehicle; and
the power converter is accommodated in the inverter space disposed above the motor space.

11. The motor apparatus according to claim 10, wherein the control circuit is accommodated in the inverter space different from the inverter space or spaces accommodating the power converter and the capacitor.

12. The motor apparatus according to claim 11, comprising two of the pumps disposed within the case and connected to each other in series on the cooling passage.

13. The motor apparatus according to claim 10, comprising two of the pumps disposed within the case and connected to each other in series on the cooling passage.

14. The motor apparatus according to claim 1, wherein the control circuit is accommodated in the inverter space different from the inverter space or spaces accommodating the power converter and the capacitor.

15. The motor apparatus according to claim 14, comprising two of the pumps disposed within the case and connected to each other in series on the cooling passage.

16. The motor apparatus according to claim 1, comprising two of the pumps disposed within the case and connected to each other in series on the cooling passage.

* * * * *